(12) United States Patent
Kim

(10) Patent No.: US 10,562,102 B2
(45) Date of Patent: Feb. 18, 2020

(54) GREEN COMPACT OF SINTERED CONNECTING ROD USING DIFFERENT KIND OF POWDER AND METHOD OF MANUFACTURING THE SAME

(71) Applicant: HYUNDAI MOTOR COMPANY, Seoul (KR)

(72) Inventor: Hak-Soo Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 683 days.

(21) Appl. No.: 14/868,279

(22) Filed: Sep. 28, 2015

(65) Prior Publication Data

US 2016/0193659 A1    Jul. 7, 2016

(30) Foreign Application Priority Data

Jan. 6, 2015    (KR) .................. 10-2015-0001379

(51) Int. Cl.
| | | |
|---|---|---|
| *B22F 7/02* | (2006.01) | |
| *F16C 7/02* | (2006.01) | |
| *C22C 33/02* | (2006.01) | |
| *B22F 3/00* | (2006.01) | |
| *B22F 3/03* | (2006.01) | |
| *B22F 7/06* | (2006.01) | |

(52) U.S. Cl.
CPC ............... *B22F 7/02* (2013.01); *B22F 3/004* (2013.01); *B22F 3/03* (2013.01); *B22F 7/062* (2013.01); *C22C 33/0264* (2013.01); *F16C 7/023* (2013.01); *B22F 2003/033* (2013.01)

(58) Field of Classification Search
CPC ............... B22F 7/06; B22F 7/02; F16C 7/023

USPC .......................................................... 75/751
See application file for complete search history.

(56) References Cited

U.S. PATENT DOCUMENTS

| | | | |
|---|---|---|---|
| 7,299,715 B2 | 11/2007 | Cagney et al. | |
| 2004/0134306 A1* | 7/2004 | Liu | B22F 7/06 |
| | | | 74/579 R |
| 2007/0261514 A1 | 11/2007 | Geiman et al. | |
| 2015/0232972 A1* | 8/2015 | Park | F16C 7/023 |
| | | | 148/625 |

FOREIGN PATENT DOCUMENTS

| | | |
|---|---|---|
| JP | H07-293545 A | 11/1995 |
| JP | 3635473 B2 | 4/2005 |
| JP | 2009-0167482 A | 7/2009 |
| KR | 10-2008-0110675 A | 12/2008 |

OTHER PUBLICATIONS

F. Cui, et al., "Brief Introduction of the Role of Alloying Elements in Steel," Production and Quality Control of Plate, Metallurgical Industry Press, Oct. 2008, pp. 358-360.

* cited by examiner

*Primary Examiner* — Weiping Zhu
(74) *Attorney, Agent, or Firm* — Morgan, Lewis & Bockius LLP

(57) ABSTRACT

A green compact of a sintered connecting rod is provided comprising a first end having a circular shape formed from a first powder, and connected to a crank shaft. A second end having a circular shape is formed from a second powder, and connected to a piston, wherein a diameter of the first end is larger than a diameter of the second end. A rod connects the first end and the second end.

8 Claims, 11 Drawing Sheets

GREEN COMPACT OF SINTERED CONNECTING ROD USING DIFFERENT KIND OF POWDER AND METHOD OF MANUFACTURING THE SAME

CROSS-REFERENCE TO RELATED APPLICATION

This application claims under 35 U.S.C. § 119(a) the benefit of priority to Korean Patent Application No. 10-2015-1379, filed on Jan. 6, 2015, the entirety of which is incorporated herein by reference.

TECHNICAL FIELD

The present disclosure relates to a green compact of a sintered connecting rod using multiple powders and a method of manufacturing the same. More particularly, it relates to a green compact of a sintered connecting rod, which can maintain performance as well as reduce manufacturing cost by using multiple powders for each part constituting the green compact of the connecting rod, and a method of manufacturing the same.

BACKGROUND

Vehicle production techniques have continued to develop to overcome many problems such as diversification of customer demand, improvement of performance and quality, price reduction through cost reduction caused by competition, and supply expansion as well as mass production.

For example, a connecting rod, which is called a con-rod, is a component used for transferring the kinetic energy of a piston to a wheel through a crank shaft, and research for improving properties such as yield strength and tensile strength while reducing production cost of the connecting rod are ongoing.

In the connecting rod, a part connected to a piston pin is called a small end, and a part connected to a crank shaft through a crank pin is called a big end. Further, a rod part connects the small end and the big end, and is a part requiring excellent mechanical characteristics such as tensile load and compression load like the small end, and its cross section has an 'I' shape.

More specifically, explosion pressure formed in a cylinder of an internal combustion engine applies a large compression load to the connecting rod through a piston head longitudinally. Furthermore, because the piston moves alternately, and continuous force in the forms of tensile load and compression load is applied to the connecting rod in the longitudinal direction of the connecting rod, the connecting rod may be bent.

As a method of manufacturing the connecting rod having excellent mechanical strength such as tensile strength and compression strength, a hot forging method or a sintering forging method may be used. Here, mechanical strength may be excellent because metal flow is formed in the connecting rod manufactured by the hot forging method, but there may be a disadvantage regarding the high manufacturing cost because there may be much wasted flash and many forging processes required.

Further, the connecting rod manufactured by the sintering forging method has advantages of: lower manufacturing cost than the connecting rod manufactured by the hot forging method, very low amount of lost material because flash is not formed during the process, and no need for heat treatment for removing residual stress.

However, the big end, the small end, and the rod part constituting the connecting rod require different properties from one another, and there may be a high manufacturing cost because all of them are manufactured using expensive powder for higher stress.

Further, in the prior arts, powders are filled into a die by gravity filling, but when using different kinds of powder, there may be a problem in that they are not suitable to the object of separating and using the different kinds of powder because the powders are mixed together when the die is lowered by acceleration of gravity.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with prior art.

The present inventors have developed a green compact of a sintered connecting rod, which can reduce manufacturing cost while maintaining performance by using a different powder for forming the big end from the powder for forming the small end and the rod part, and a method of manufacturing the same.

The present disclosure may provide a green compact of a sintered connecting rod using different powders, which can maintain performance and reduce manufacturing cost by manufacturing the green compact of a sintered connecting rod using different powders depending on each part, and a method of manufacturing the same.

To achieve the above objects, the present disclosure includes the following constituents.

In one aspect, the present disclosure provides a green compact of a sintered connecting rod comprising a first end having a circular shape formed from a first powder and connected to a crank shaft, a second end having a circular shape formed from a second powder and connected to a piston. A rod connects the first end and the second end.

The first powder may comprise carbon, copper, manganese, phosphorus, sulfur, and iron.

The big end may comprise carbon, copper, manganese, phosphorus, sulfur, and iron.

The big end may comprises at most 0.7 wt % carbon, at most 2.0 wt % copper, between 0.3 to 0.5 wt % manganese, at most 1.0 wt % phosphorus, and at most 0.3 wt % sulfur.

The second powder may comprise carbon, copper, chromium, molybdenum, vanadium, nickel, phosphorus, and iron.

The small end and the rod may collectively comprise carbon, copper, chromium, molybdenum, vanadium, nickel, phosphorus, and iron.

The small end and the rod may collectively comprise at most 0.7 wt % carbon, at most 2.0 wt % copper, at most 3.0 wt % chromium, at most 1.0 wt % molybdenum, at most 1.0 wt % vanadium, at most 4.0 wt % nickel, and at most 1.0 wt % phosphorus.

A method of manufacturing a green compact of a sintered connecting rod may comprise steps of: injecting a first powder and a second powder into a feeding shoe having a barrier rib; raising a lower big end punch and a lower small end punch while raising a big end core, a small end core, and a lower rod part punch to the same height with a connecting rod die, transferring the feeding shoe for positioning thereof on the connecting rod die along a rail; filling the first powder and the second powder into the connecting rod die after completing the transfer of the feeding shoe, wherein the first powder and the second powder are suction filled into the connecting rod die by raising the connecting rod die, the big end core, the small end core and the feeding shoe at the same time at the same rate; transferring the feeding shoe to the initial position after completing the suction filling, and then raising the connecting rod die further in order to inhibit leaking of the first powder and the second powder out of the die when pressurizing the first powder and the second powder filled in the connecting rod die; manufacturing a green compact of a sintered connecting rod by pressurizing the first powder and the second powder filled in the connecting rod die, by lowering a upper punch, which is located on top of the first powder and the second powder filled in the connecting rod die, and raising the lower big end punch, the lower small end punch and the lower rod part punch at the same time; and raising the upper punch and lowering the connecting rod die, the big end core and the small end core at the same time, and then extracting the green compact of a sintered connecting rod.

The position of the barrier rib in the feeding shoe may become a R part, which is formed between the big end and the rod part of the green compact of connecting rod.

The raising rate of the connecting rod die, the big end core, the small end core and the feeding shoe may be 0.1 to 5 m/s.

The lower end part of the barrier rib, which penetrates the bottom of the feeding shoe due to the height of the barrier rib, which is longer than the height of the feeding shoe, may contact the R part of the lower rod part punch when the feeding shoe is located on the connecting rod die.

The end of the lower end part of the barrier rib, which contacts the R part of the lower rod part punch, may have a round shape corresponding to the R part of the lower rod part punch.

A thickness of the barrier rib may be 1 to 5 mm.

Other aspects and exemplary embodiments of the inventive concept are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present inventive concept will now be described in detail with reference to certain exemplary embodiments thereof illustrated the accompanying drawings which are given hereinbelow by way of illustration only, and thus are not limitative of the present inventive concept.

Figure 1:
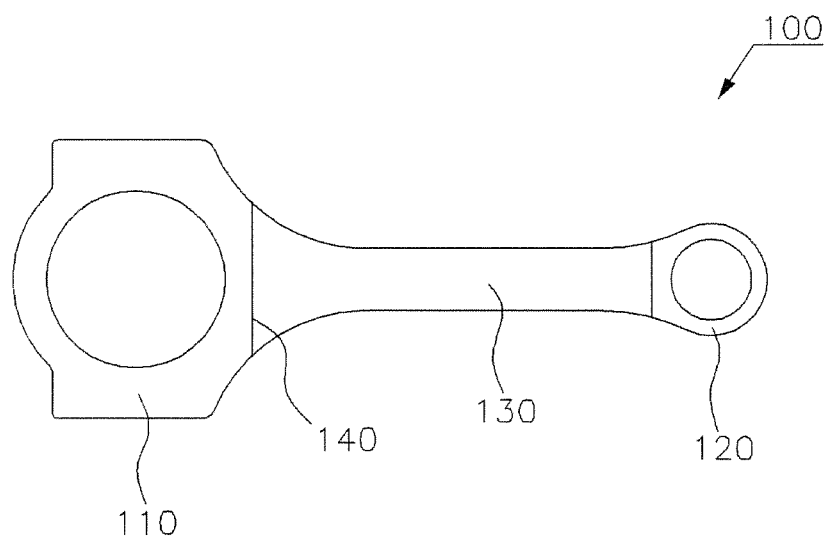
FIG. 1 is a plane view of a green compact of a sintered connecting rod.

It should be understood that the appended drawings are not necessarily to scale, presenting a somewhat simplified representation of various preferred features illustrative of the basic principles of the inventive concept. The specific design features of the present inventive concept as disclosed herein, including, for example, specific dimensions, orientations, locations, and shapes will be determined in part by the particular intended application and use environment.

In the figures, reference numbers refer to the same or equivalent parts of the present inventive concept throughout the several figures of the drawing.

DETAILED DESCRIPTION

Hereinafter reference will now be made in detail to various embodiments of the present inventive concept, examples of which are illustrated in the accompanying drawings and described below. While the inventive concept will be described in conjunction with exemplary embodiments, it will be understood that present description is not intended to limit the invention to those exemplary embodiments. On the contrary, the inventive concept is intended to cover not only the exemplary embodiments, but also various alternatives, modifications, equivalents and other embodiments, which may be included within the spirit and scope of the inventive concept as defined by the appended claims.

The present inventive concept relates to a green compact of a sintered connecting rod using different powders and a method of manufacturing the same, and in one aspect, the present inventive concept relates to a green compact of a sintered connecting rod using multiple powders.

Figure 2:
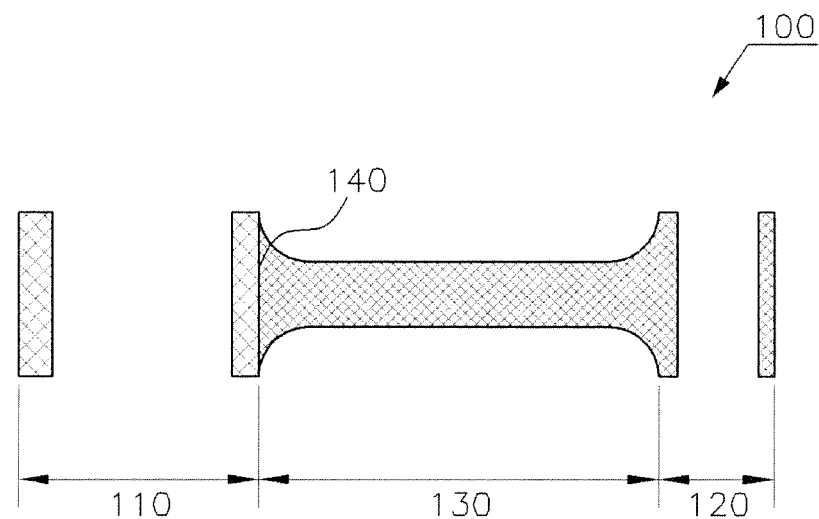
FIG. 2 is a cross sectional view of a green compact of a sintered connecting rod.

FIG. 1 is a plane view of the green compact of a sintered connecting rod according to the present inventive concept, and FIG. 2 is a cross-sectional view of the green compact of a sintered connecting rod. As shown in FIG. 1 and FIG. 2, the green compact of a sintered connecting rod 100 according to the present inventive concept is characterized by comprising: a circular big end 110, which is formed from the first powder, and connected to a crank shaft; a circular small end 120, which is formed from the second powder, and connected to a piston; and a bar-type rod part 130 for connecting the big end 110 and the small end 120.

Herein, because more stress is concentrated on the small end 120 and the rod part 130 than the big end 110, an advanced alloy may be used to secure properties such as strength. Thus, the small end may use advanced alloy powder and the like. On the contrary, because less stress is concentrated on the big end 110 than the small end 120 and the rod part 130, there is no need to use the advanced alloy such as the alloy used for the small end 120 and the rod part 130. For this reason, when manufacturing a sintered connecting rod through the green compact of a sintered connecting rod using different kind of powders, an effect of reducing manufacturing cost and the like can be achieved.

For this, the first powder forming the big end 110 in the green compact of a sintered connecting rod may comprise carbon (C), copper (Cu), manganese (Mn), phosphorus (P), sulfur (S) and iron (Fe) and the like, and, based on the total big end 110 weight, the carbon (C) may be in a content of greater than 0 to 0.7 wt % or less, the copper (Cu) may be in a content of greater than 0 to 2.0 wt % or less, the manganese (Mn) may be in a content of 0.3 to 0.5 wt %, the phosphorus (P) may be in a content of greater than 0 to 1.0 wt % or less, the sulfur (S) may be in a content of greater than 0 to 0.3 wt % or less and the iron (Fe) may comprise the balance.

Further, the second powder 210 forming the small end 120 and the rod part 130 may comprise carbon (C), copper (Cu), chromium (Cr), molybdenum (Mo), vanadium (V), nickel (Ni), phosphorus (P) and iron (Fe) and the like, and, based on the total small end 120 and rod part 130 weight, the carbon (C) may be in a content of greater than 0 to 0.7 wt % or less, the copper (Cu) may be in a content of greater than 0 to 2.0 wt % or less, the chromium (Cr) may be in a content of greater than 0 to 3.0 wt % or less, the molybdenum (Mo) may be in a content of greater than 0 to 1.0 wt % or less, the vanadium (V) is in a content of greater than 0 to 1.0 wt % or less, the nickel (Ni) may be in a content of greater than 0 to 4.0 wt % or less, the phosphorus (P) may be in a content of greater than 0 to 1.0 wt % or less and the iron (Fe) may comprise the balance.

The reasons for the numerical limitation of ingredients constituting the big end, the small end or the rod part of the green compact of a sintered connecting rod according to the present inventive concept are as follows.

(1) Carbon (C): Greater than 0 to 0.7 wt % or less

Carbon (C) improves strength and the like and allows heat treatment and the like, but when the carbon (C) content is over 0.7 wt %, there may be a problem of deteriorating processability and the like because brittleness and hardness and the like become too high.

(2) Copper (Cu): Greater than 0 to 2.0 wt % or less

Copper (Cu) improves strength and the like, but when the copper (Cu) content is over 2.0 wt %, there may be a problem of deteriorating processability and the like.

(3) Chromium (Cr): Greater than 0 to 3.0 wt % or less

Chromium (Cr) improves strength and the like, but when the chromium (Cr) content is over 3.0 wt %, there may be a problem of deteriorating strength of the steel because it is oxidized during a sintering process.

(4) Molybdenum (Mo): Greater than 0 to 1.0 wt % or less

Molybdenum (Mo) improves strength and the like, but when the molybdenum (Mo) content is over 1.0 wt %, there may be a problem of deteriorating processability.

(5) Vanadium (V): Greater than 0 to 1.0 wt % or less

Vanadium (V) improves strength and the like, but when the vanadium (V) content is over 1.0 wt %, there may be a problem of deteriorating processability and the like.

(6) Nickel (Ni): Greater than 0 to 4.0 wt % or less,

Nickel (Ni) improves strength and the like, but when the nickel (Ni) content is over 4.0 wt %, there may be a problem of deteriorating processability and the like.

(7) Manganese (Mn): 0.3 to 0.5 wt %

Manganese (Mn) improves strength and the like by forming manganese sulfide (MnS) by reaction with sulfur (S), and showing solid-solution strengthening effect, but when the manganese (Mn) content is less than 0.3 wt %, there may be a problem of not obtaining enough solid-solution strengthening effect, but when the manganese (Mn) content is over 0.5 wt %, there may be a problem of deteriorating fatigue strength and elongation percentage and the like.

(8) Phosphorus (P): Greater than 0 to 1.0 wt % or less

Phosphorus (P) improves strength and the like and increases fracture splittability and the like, but when the phosphorus (P) content is over 1.0 wt %, there may be a problem of increasing brittleness and the like.

(9) Sulfur (S): Greater than 0 to 0.3 wt % or less

Sulfur (S) improves strength and the like by forming manganese sulfide (MnS) by reaction with manganese (Mn), and showing solid-solution strengthening effect like the manganese (Mn), but when the sulfur (S) content is over 0.3 wt %, there may be a problem of deteriorating properties such as fatigue strength and the like.

The green compact of a sintered connecting rod using a different kind of powder according to the present inventive concept may be applied to an internal-combustion engine and the like, and it may be applied to a vehicle engine and the like.

Hereinafter, in another aspect, the present inventive concept relates to a method of manufacturing the green compact of a sintered connecting rod using different powders.

Figure 3:
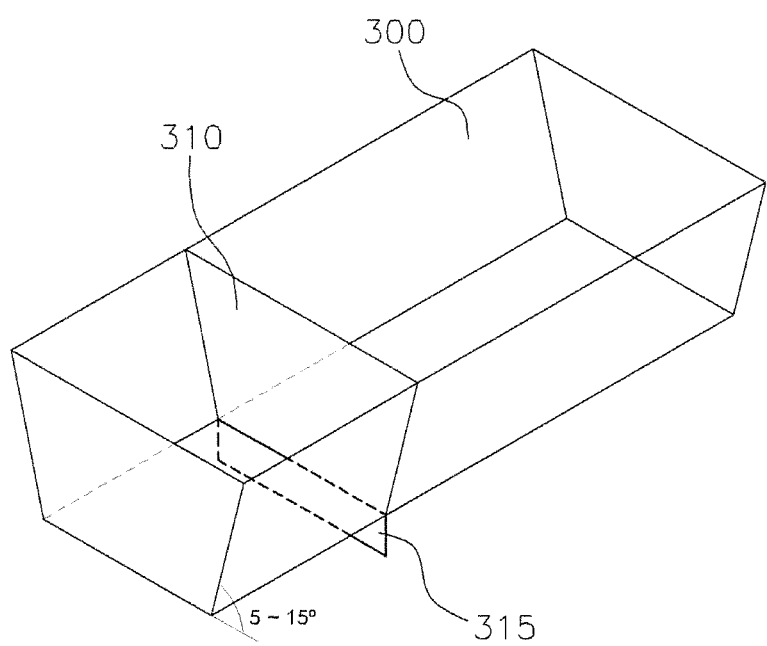
FIG. 3 is a perspective view of a feeding shoe.
Figure 4:
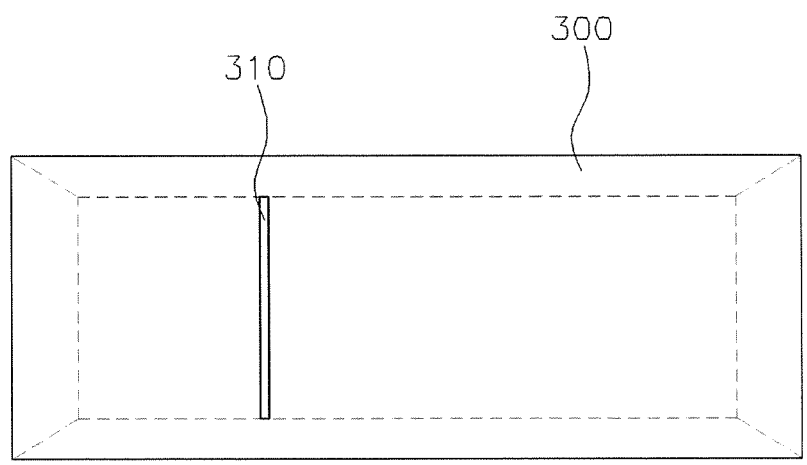
FIG. 4 is a plane view of a feeding shoe.
Figure 5:
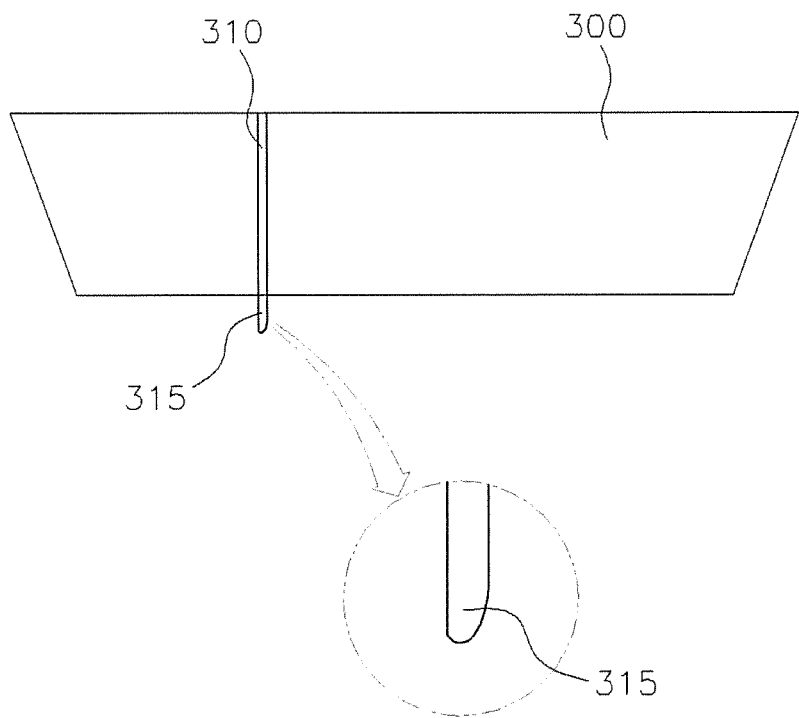
FIG. 5 is a cross sectional view of a feeding shoe.
Figure 6:
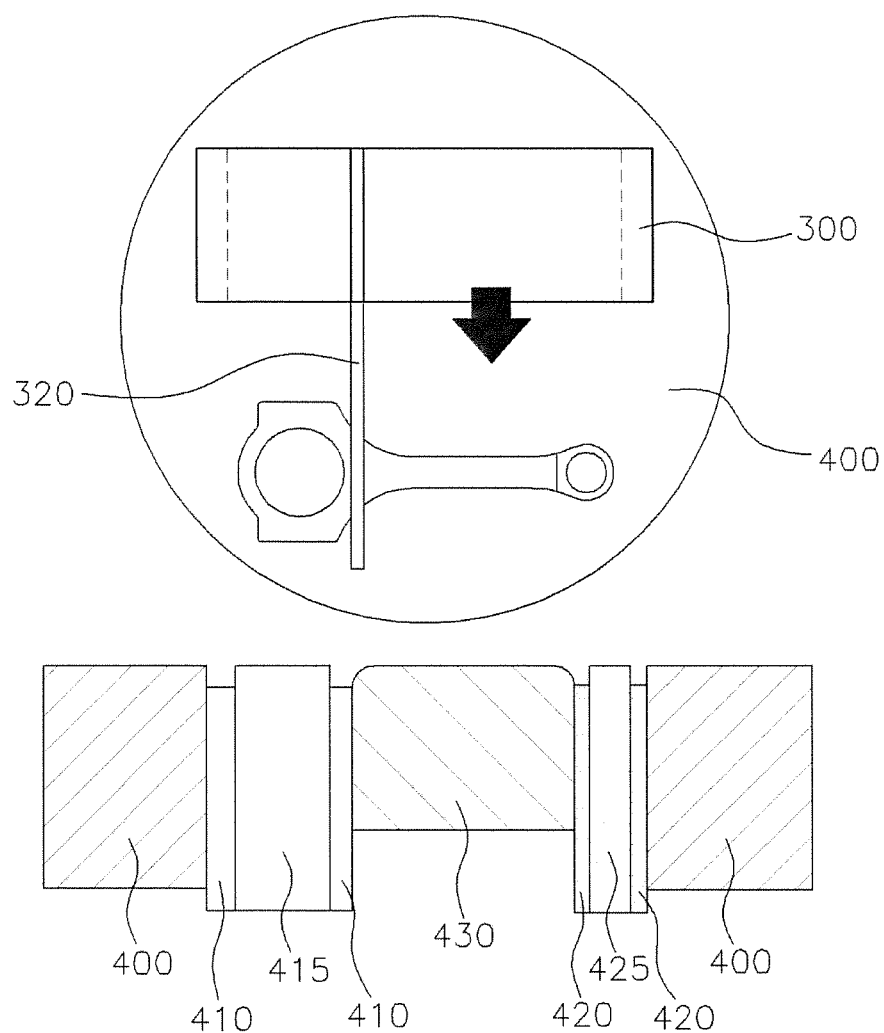
FIG. 6 is a plane view and a cross sectional view of a feeding shoe and a die when the feeding shoe is transferred to be located on a connecting rod die along a rail.
Figure 7:
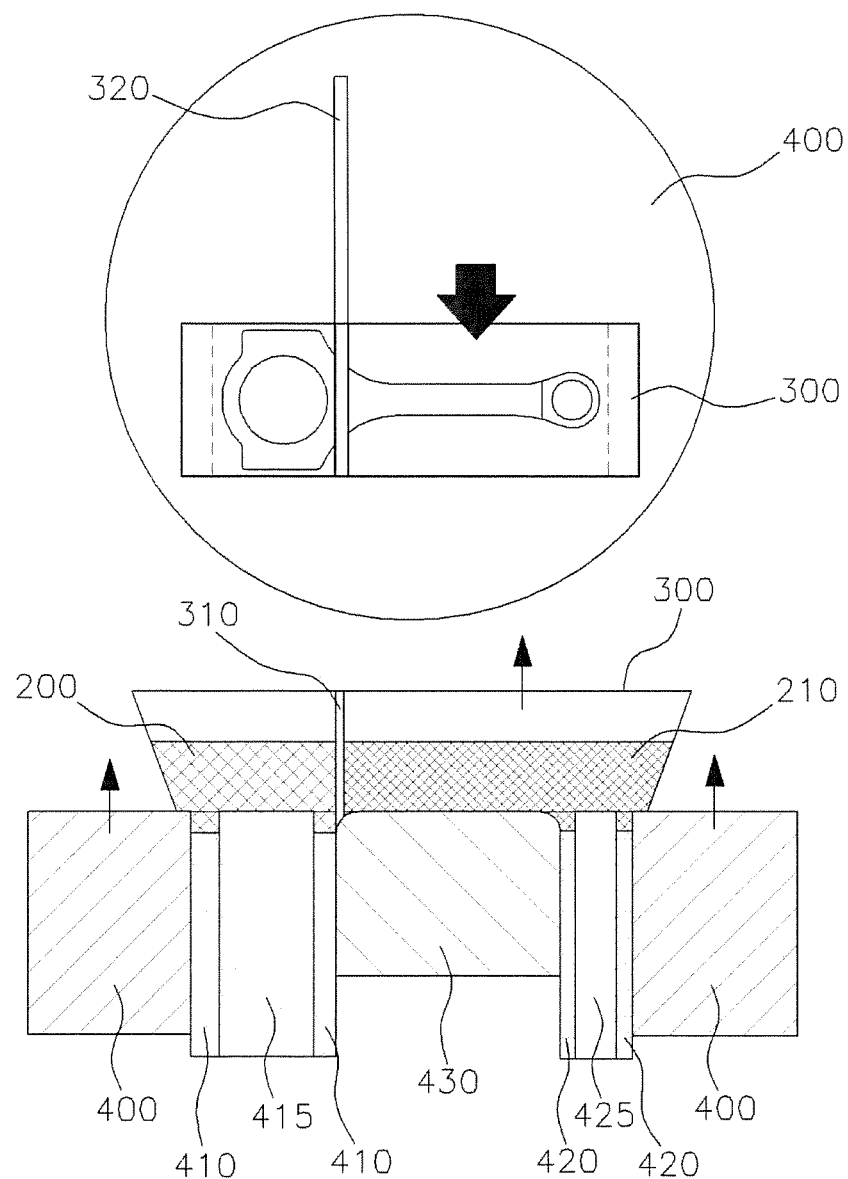
FIG. 7 is a plane view and a cross sectional view of a feeding shoe and a die when the first powder and the second powder are filled in a connecting rod die.
Figure 8:
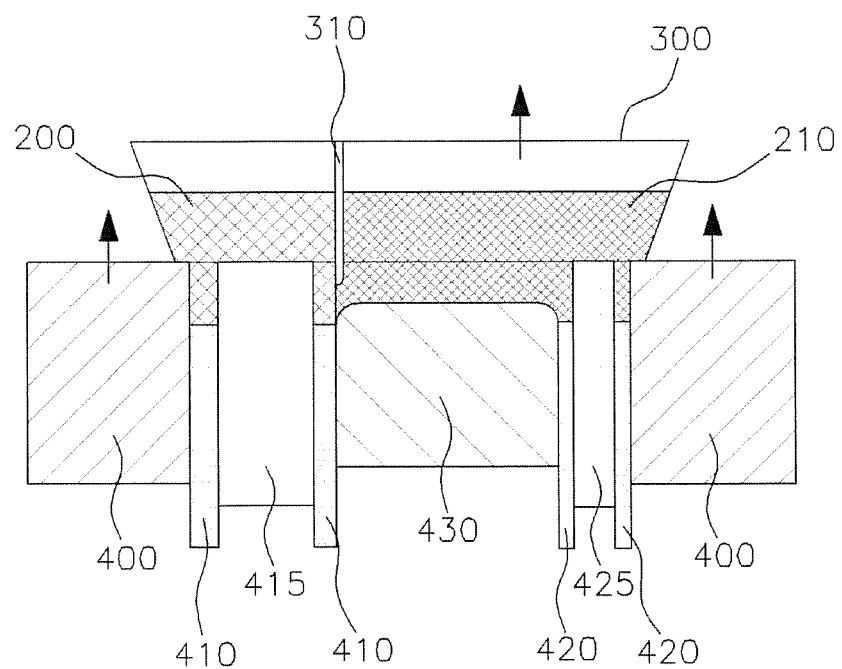
FIG. 8 is a cross-sectional view of a die when a connecting rod die, a big end core, a small end core and a feeding shoe are raised at the same time at the same rate.
Figure 9:
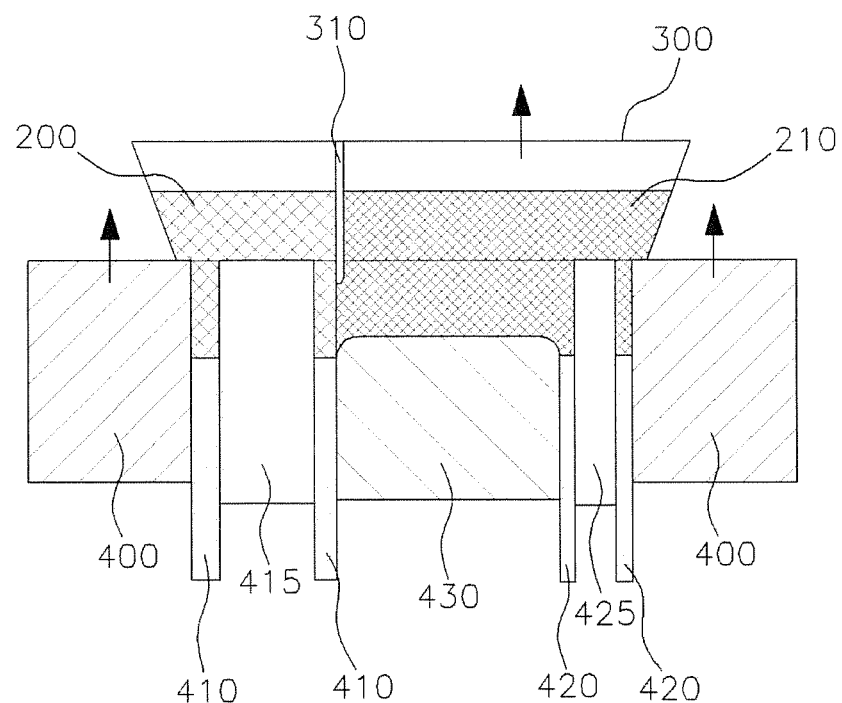
FIG. 9 is a cross-sectional view of a die when a connecting rod die, a big end core, a small end core and a feeding shoe are raised at the same time at the same rate.
Figure 10:
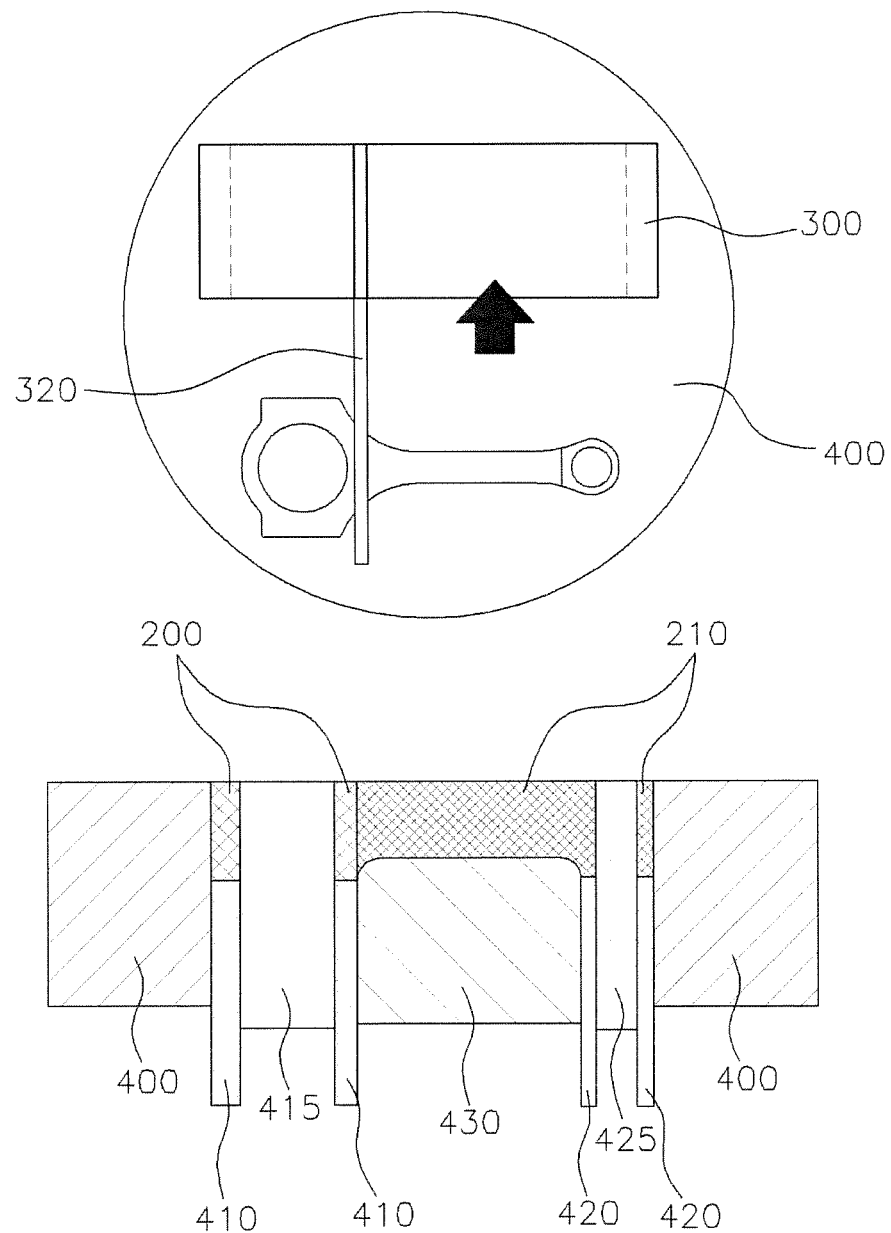
FIG. 10 is a plane view and a cross-sectional view of a feeding shoe and a die when transferring the feeding shoe to the initial position.
Figure 11:
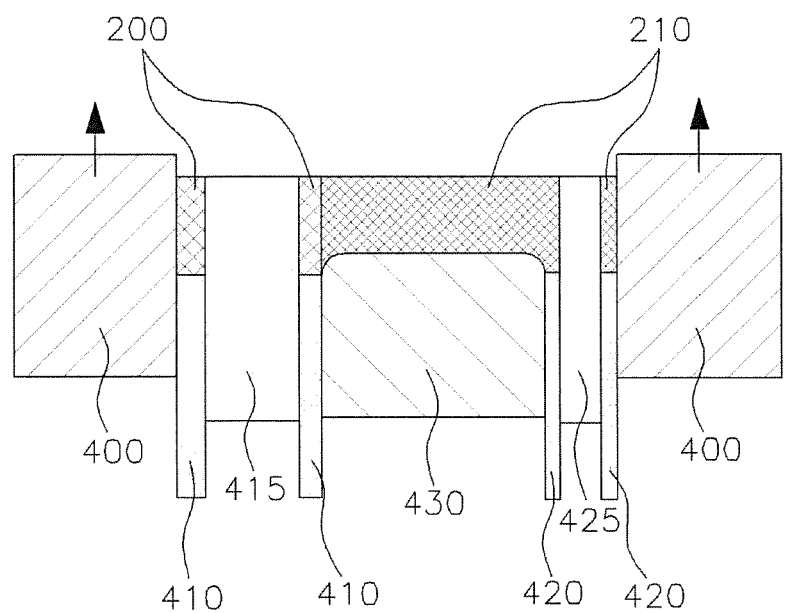
FIG. 11 is a cross-sectional view of a die when only a connecting rod die is further raised.
Figure 12:
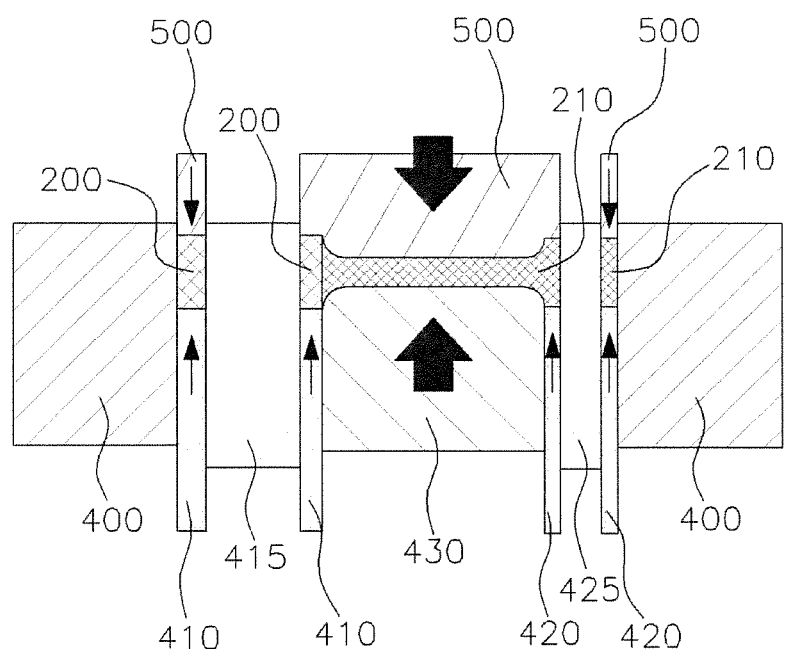
FIG. 12 is a cross-sectional view of a die when the filled first powder and second powder are pressurized.
Figure 13:
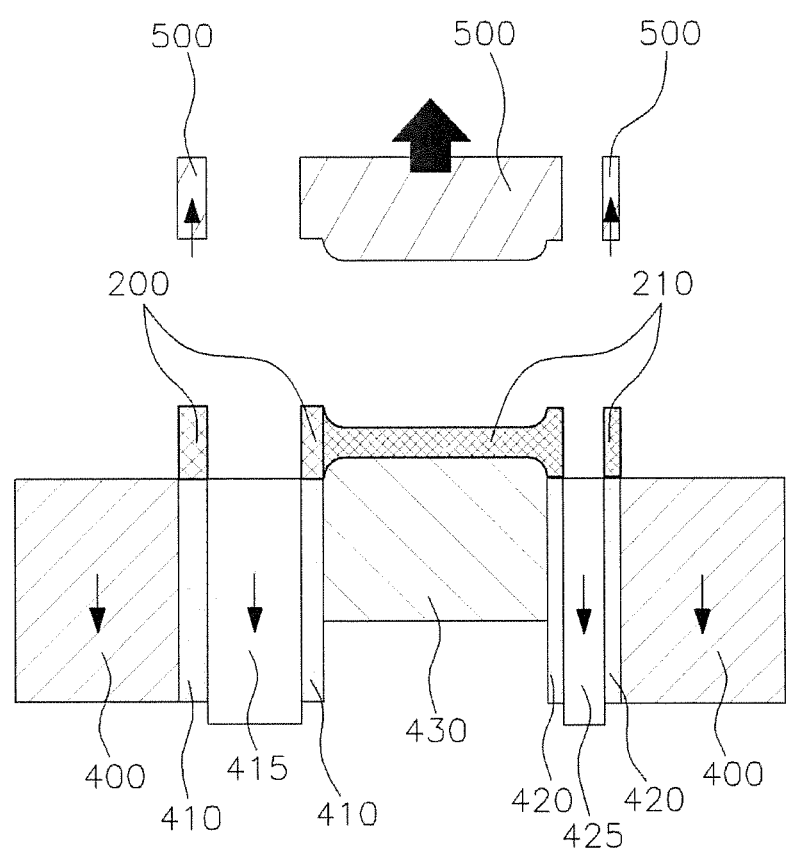
FIG. 13 is a cross-sectional view of a die when raising a upper punch and lowering a connecting rod die, a big end core and a small end core at the same time.

The method of manufacturing the green compact of a sintered connecting rod using different powders according to the present inventive concept is characterized by comprising a first step of injecting a first powder 200 and a second powder 210 into a feeding shoe 300 having a barrier rib 310 as illustrated in FIG. 3 to FIG. 5, which prevents the first powder 200 for forming a circular big end 110 and the second powder 210 for forming a circular small end 120 and for forming a bar-type rod part 130 for connecting the small end 120 and the big end 110 from mixing each other. A second step of raising a lower big end punch 410 and a lower small end punch 425 while raising a big end core 415, a small end core 425 and a lower rod part punch 430 to the same height with a connecting rod die 400, and then transferring the feeding shoe 300 for positioning thereof on the connecting rod die 400 along a rail 320 is illustrated in FIG. 6. A third step of filling the first powder 200 and the second powder 210 into the connecting rod die 400 after completing the transfer of the feeding shoe 300 is illustrated in FIG. 7. The first powder 200 and the second powder 210 are suction filled into the connecting rod die 400 by raising the connecting rod die 400, the big end core 415, the small end core 425 and the feeding shoe 300 at the same time at the same rate as illustrated in FIG. 8 and FIG. 9. A fourth step of transferring the feeding shoe 300 to the initial position after completing the suction filling is illustrated in FIG. 10. The connecting rod die 400 is raised further in order to inhibit leaking of the first powder 200 and the second powder 210 out of the die when pressurizing the first powder 200 and the second powder 210 filled in the connecting rod die 400 as illustrated in FIG. 11. A fifth step of manufacturing a green compact of a sintered connecting rod 100 by pressurizing the first powder 200 and the second powder 210 filled in the connecting rod die 400 by lowering a upper punch 500, which is located on top of the first powder 200 and the second powder 210 filled in the connecting rod die 400, and raising the lower big end punch 410, the lower small end punch 420 and the lower rod part punch 430 at the same time is illustrated in FIG. 12. A sixth step of raising the upper punch 500 and lowering the connecting rod die 420, the big end core 415 and the small end core 425 at the same time, and then extracting the green compact of a sintered connecting rod 100 is illustrated in FIG. 13.

Herein, the first powder 200 may comprise carbon (C), copper (Cu), manganese (Mn), phosphorus (P), sulfur (S) and iron (Fe) and the like, wherein, based on the total big end 110 weight, the carbon (C) may be in a content of greater than 0 to 0.7 wt % or less, the copper (Cu) may be in a content of greater than 0 to 2.0 wt % or less, the manganese (Mn) is may be in a content of 0.3 to 0.5 wt %, the phosphorus (P) may be in a content of greater than 0 to 1.0 wt % or less, the sulfur (S) may be in a content of greater than 0 to 0.3 wt % or less and the iron (Fe) may comprise the balance.

Further, the second powder 210 may comprise carbon (C), copper (Cu), chromium (Cr), molybdenum (Mo), vanadium (V), nickel (Ni), phosphorus (P) and iron (Fe) and the like, wherein, based on the total small end 120 and rod part 130 weight, the carbon (C) may be in a content of greater than 0 to 0.7 wt % or less, the copper (Cu) may be in a content of greater than 0 to 3.5 wt % or less, the chromium (Cr) may be in a content of greater than 0 to 3.0 wt % or less, the molybdenum (Mo) may be in a content of greater than 0 to 1.0 wt % or less, the vanadium (V) may be in a content of greater than 0 to 1.0 wt % or less, the nickel (Ni) may be in a content of greater than 0 to 1.0 wt % or less, the phosphorus (P) may be in a content of greater than 0 to 1.0 wt % or less and the iron (Fe) may comprise the balance.

On the other hand, the position of the barrier rib 310 in the feeding shoe 300 may become an R part 140, which is formed between the big end 110 and the rod part 130 of the green compact of connecting rod.

Further, the raising rate of the connecting rod die 400, the big end core 415, the small end core 425 and the feeding shoe 300 in the third step may be about 0.1 to 5 m/s. Herein, when the raising rate may be about less than 0.1 m/s, productivity may be deteriorated because powder filling time into the connecting rod die 400 becomes too long, but when the raising rate is over about 5 m/s, the first powder 200 and the second powder 210 may not be filled into the connecting rod die 400 sufficiently.

Further, the lower end part 315 of the barrier rib, which penetrates the bottom of the feeding shoe 310 due to the height of the barrier rib 310, which is longer than the height of the feeding shoe 300, may be contacted to the R part 140 of the lower rod part punch 430 and the like when the feeding shoe 300 is located on the connecting rod die 400.

Like this, when the first powder 200 and the second powder 210 are suction filled into the connecting rod die 400 by contact of the lower end part 315 of the barrier rib 310 and the lower rod part punch 430, there is an effect of maximally inhibiting mixing of the first powder 200 and the second powder 210 each other.

Further, the end of the lower end part 315 of the barrier rib, which is contacted to the R part 140 of the lower rod part punch 430, may have a round shape so as to correspond to the R part 140 of the lower rod part punch 430.

Further, when the feeding shoe 300 is transferred along the rail 320 in the second step and the fourth step, the lower end part 315 of the barrier rib, which protrudes at the bottom of the feeding shoe 300, plays a role of helping the feeding shoe 300 to be transferred to an exact position, corresponding to the rail 300.

And, thickness of the barrier rib 310 may be about 1 to 5 mm. Herein, when thickness of the barrier rib 310 is less than about 1 mm, it may be broken because it does not endure weight of the first powder 200 and the second powder 210, and when thickness of the barrier rib is over about 5 mm, it may disturb filling when filling the powder into the connecting rod die 400.

As mentioned above, the present inventive concept having the constitution described above has an effect of maintaining performance of a connecting rod as well as reducing manufacturing cost by using a different kind of powder for forming a big end from the powder for forming a small end and a rod part.

The inventive concept has been described in detail with reference to multiple embodiments thereof. However, it will be appreciated by those skilled in the art that changes may be made in these embodiments without departing from the principles and spirit of the inventive concept, the scope of which is defined in the appended claims and their equivalents.

What is claimed is:

1. A green compact of a sintered connecting rod comprising:
    a first end having a circular shape formed from a first powder, and connected to a crank shaft;
    a second end having a circular shape formed from a second powder, and connected to a piston; and
    a rod connecting the first end and the second end,
    wherein a diameter of the first end is larger than a diameter of the second end,
    wherein the second powder comprises carbon, copper, chromium, molybdenum, vanadium, nickel, phosphorus, and iron,
    wherein the second end and the rod collectively comprise:
        greater than 0 to 0.7 wt % carbon;
        greater than 0 to 2.0 wt % copper;
        greater than 0 to 3.0 wt % chromium;
        greater than 0 to 1.0 wt % molybdenum;
        greater than 0.4 to 1.0 wt % vanadium;
        greater than 0 to 4.0 wt % nickel; and
        greater than 0 to 1.0 wt % phosphorus, and
        wherein wt % is based on a total weight of the second end and the rod,
    wherein the first end comprises:
        greater than 0 to 0.7 wt % carbon,
        greater than 0 to 2.0 wt % copper,
        0.3 to 0.5 wt % manganese,
        greater than 0 to 1.0 wt % phosphorus,
        greater than 0 to 0.3 wt % sulfur, and
        a balance of iron,
        wherein wt % is based on a total weight of the first end.

2. A vehicle engine comprising the green compact of the sintered connecting rod of claim 1.

3. A method of manufacturing a green compact of a sintered connecting rod of claim 1, which comprises steps of:
    injecting a first powder and a second powder into a feeding shoe having a barrier rib;
    raising a lower first end punch and a lower second end punch while raising a first end core, a second end core, and a lower rod punch to the same height with a connecting rod die,
    transferring the feeding shoe for positioning thereof on the connecting rod die along a rail;
    filling the first powder and the second powder into the connecting rod die after completing the transfer of the feeding shoe, wherein the first powder and the second powder are suction filled into the connecting rod die by raising the connecting rod die, the big end core, the small end core and the feeding shoe at the same time at the same rate;

transferring the feeding shoe to the initial position after completing the suction filling, and then raising the connecting rod die further in order to inhibit leaking of the first powder and the second powder out of the die when pressurizing the first powder and the second powder filled in the connecting rod die;

manufacturing the green compact of the sintered connecting rod by pressurizing the first powder and the second powder filled in the connecting rod die, by lowering an upper punch, which is located on top of the first powder and the second powder filled in the connecting rod die, and raising the lower first end punch, the lower second end punch and the lower rod punch at the same time; and raising the upper punch and lowering the connecting rod die, the first end core and the second end core at the same time, and then extracting the green compact of the sintered connecting rod.

4. The method of manufacturing the green compact of the sintered connecting rod of claim 3, wherein the position of the barrier rib in the feeding shoe becomes an R part, which is formed between the big end and the rod part of the green compact of the connecting rod.

5. The method of manufacturing the green compact of the sintered connecting rod of claim 3, wherein the raising rate of the connecting rod die, the big end core, the small end core and the feeding shoe is 0.1 to 5 m/s.

6. The method of manufacturing the green compact of the sintered connecting rod of claim 3, wherein the lower end part of the barrier rib, which penetrates the bottom of the feeding shoe due to the height of the barrier rib, which is longer than the height of the feeding shoe, contacts the R part of the lower rod part punch when the feeding shoe is located on the connecting rod die.

7. The method of manufacturing the green compact of the sintered connecting rod of claim 3, wherein the end of the lower end part of the barrier rib, which contacts the R part of the lower rod part punch, has a round shape corresponding to the R part of the lower rod part punch.

8. The method of manufacturing the green compact of the sintered connecting rod of claim 3, wherein a thickness of the barrier rib is 1 to 5 mm.

* * * * *